United States Patent [19]
Kanehl, Jr.

[11] Patent Number: 5,511,493
[45] Date of Patent: Apr. 30, 1996

[54] VEHICLE MOUNTABLE TABLE

[76] Inventor: Donald A. Kanehl, Jr., 240 Hewlett Ave., East Patchogue, N.Y. 11772

[21] Appl. No.: 306,620

[22] Filed: Sep. 15, 1994

Related U.S. Application Data

[62] Division of Ser. No. 23,168, May 19, 1994, abandoned, which is a continuation of Ser. No. 911,316, Jul. 10, 1992, abandoned.

[51] Int. Cl.⁶ ................................................. A47B 23/00
[52] U.S. Cl. .................................................. 108/44; 108/47
[58] Field of Search ........................... 108/42, 44, 45, 108/46, 47, 48, 43

[56] References Cited

U.S. PATENT DOCUMENTS

| | | | |
|---|---|---|---|
| 906,538 | 12/1908 | Limogos | 108/147 X |
| 2,503,602 | 4/1950 | Titley | 108/47 X |
| 2,533,093 | 12/1950 | Nussbaum | 108/47 X |
| 2,687,336 | 8/1954 | Smith et al. | 108/44 X |
| 2,720,436 | 10/1955 | Covey | 108/44 X |
| 2,856,251 | 10/1958 | Garrison | 108/44 |
| 2,921,824 | 1/1960 | Lichter | 108/44 X |
| 3,289,611 | 12/1966 | Flanders | 108/44 |
| 3,335,679 | 8/1967 | Bown | 108/44 |
| 3,556,589 | 1/1971 | Messier | 108/44 X |
| 3,625,161 | 12/1971 | Rosner | 108/44 |

FOREIGN PATENT DOCUMENTS 47195  4/1933  Denmark .................................. 108/46

Primary Examiner—José V. Chen

[57] ABSTRACT

A table for supporting objects within a vehicle. The inventive device includes a pair of mounting brackets securable to a door or seat of the associated vehicle. A table member is coupled to the mounting brackets by an adjustment assembly which permits vertical movement of the tray relative to the brackets.

7 Claims, 3 Drawing Sheets

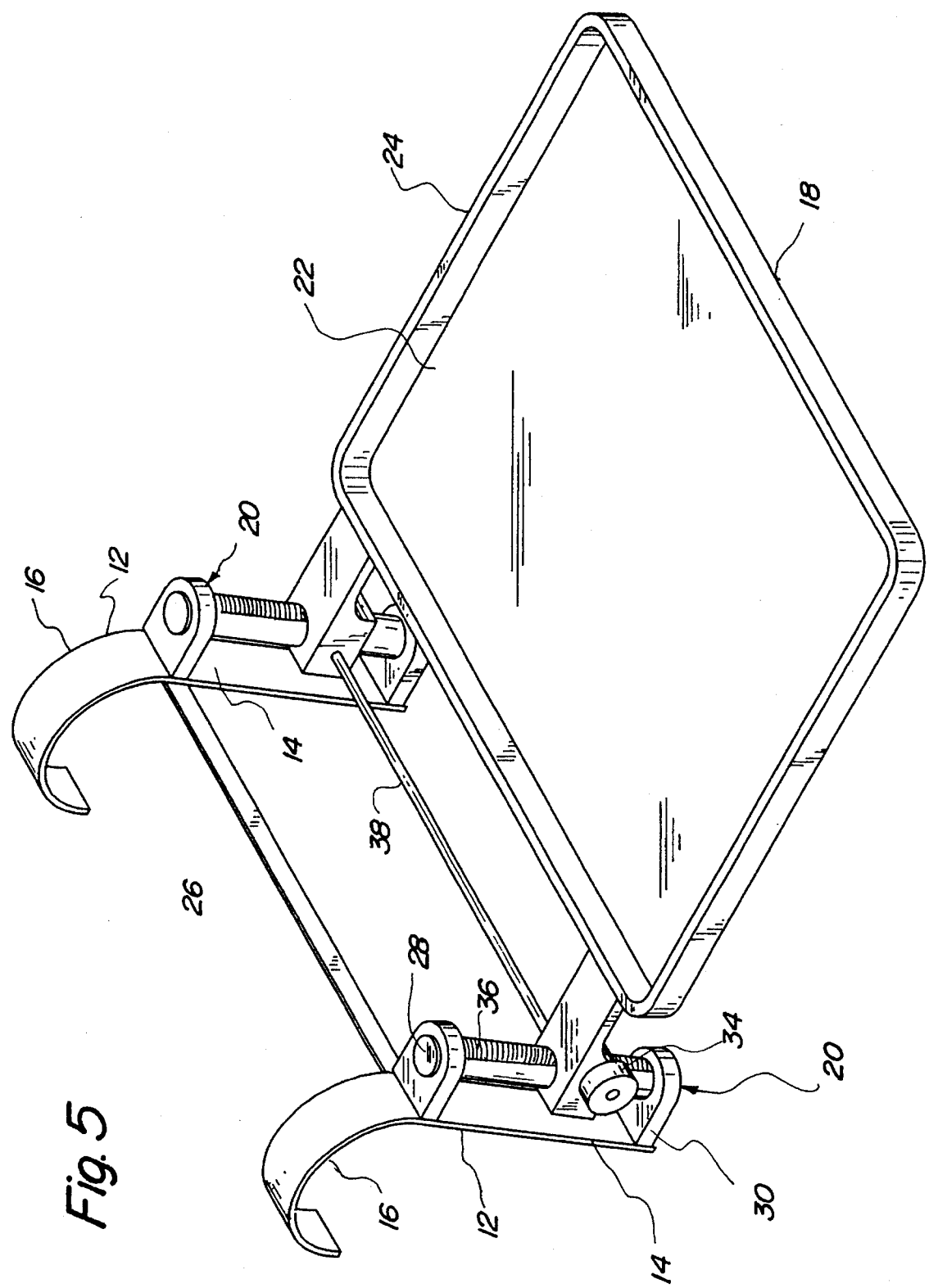

1

VEHICLE MOUNTABLE TABLE

RELATED APPLICATION

This application is a divisional of application, Ser. No. 29/023,168, filed May 19, 1994, now abandoned which, in turn, is a continuation of prior application Ser. No. 07/911,316, filed Jul. 10, 1992, now abandoned.

BACKGROUND OF THE INVENTION

1. Field of the Invention

The present invention relates to table structures and more particularly pertains to a vehicle mountable table for supporting objects within a vehicle.

2. Description of the Prior Art

The use of table structures is known in the prior art. More specifically, table structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art table structures include U.S. Pat. Nos. 4,940,003; 4,858,796; 4,830,242; 4,519,648; and 3,785,300.

While these devices fulfill their respective, particular objectives and requirements, the aforementioned patents do not disclose a vehicle mountable table for supporting objects within a vehicle which includes a pair of mounting brackets securable to a door or seat of the vehicle, and a table member coupled to the mounting brackets by an adjustment assembly which permits vertical movement of the tray relative to brackets.

In these respects, the vehicle mountable table according to the present invention substantially departs from the conventional concepts and designs of the prior art, and in so doing provides an apparatus primarily developed for the purpose of supporting objects within a vehicle.

SUMMARY OF THE INVENTION

In view of the foregoing disadvantages inherent in the known types of table structures now present in the prior art, the present invention provides a new vehicle mountable table construction wherein the same can be utilized for supporting objects such as food or the like within an associated vehicle. As such, the general purpose of the present invention, which will be described subsequently in greater detail, is to provide a new vehicle mountable table apparatus and method which has many of the advantages of the table structures mentioned heretofore and many novel features that result in a vehicle mountable table which is not anticipated, rendered obvious, suggested, or even implied by any of the prior art table structures, either alone or in any combination thereof.

To attain this, the present invention generally comprises a table for supporting objects within a vehicle. The inventive device includes a pair of mounting brackets securable to a door or seat of the associated vehicle. A table member is coupled to the mounting brackets by an adjustment assembly which permits vertical movement of the tray relative to the brackets.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle mountable table apparatus and method which has many of the advantages of the table structures mentioned heretofore and many novel features that result in a vehicle mountable table which is not anticipated, rendered obvious, suggested, or even implied by any of the prior art table structures, either alone or in any combination thereof.

It is another object of the present invention to provide a new vehicle mountable table which may be easily and efficiently manufactured and marketed.

It is a further object of the present invention to provide a new vehicle mountable table which is of a durable and reliable construction.

An even further object of the present invention is to provide a new vehicle mountable table which is susceptible of a low cost of manufacture with regard to both materials and labor, and which accordingly is then susceptible of low prices of sale to the consuming public, thereby making such vehicle mountable tables economically available to the buying public.

Still yet another object of the present invention is to provide a new vehicle mountable table which provides in the apparatuses and methods of the prior art some of the advantages thereof, while simultaneously overcoming some of the disadvantages normally associated therewith.

Still another object of the present invention is to provide a new vehicle mountable table for supporting objects such as food or the like within an associated vehicle.

Yet another object of the present invention is to provide a new vehicle mountable table which includes a pair of mounting brackets securable to a door or seat of a vehicle, and a table member coupled to the mounting brackets by an adjustment assembly which permits vertical movement of the tray relative to brackets.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a isometric illustration of the present invention including an alternative adjustment means.

DESCRIPTION OF THE PREFERRED EMBODIMENT

Figure 1:
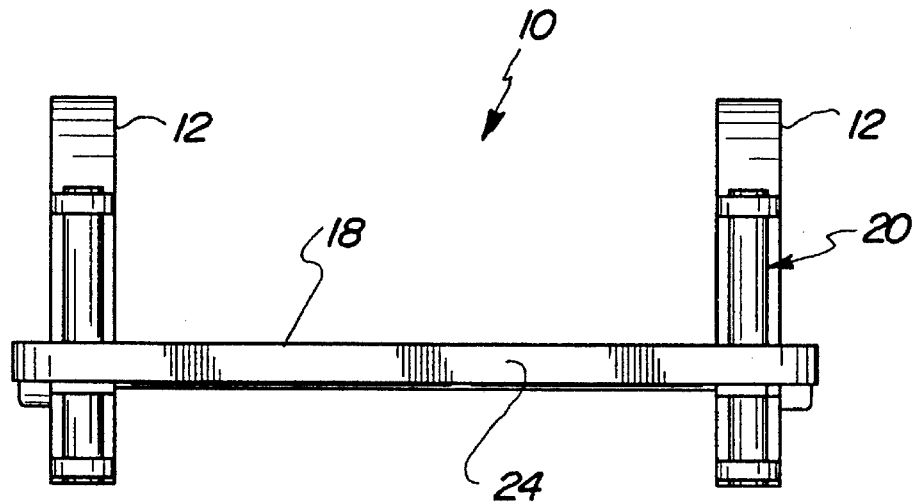
FIG. 1 is a front elevation view of a vehicle mountable table according to the present invention.

With reference now to the drawings, and in particular to FIGS. 1–5 thereof, a new vehicle mountable table embodying the principles and concepts of the present invention and generally designated by the reference numeral 10 will be described.

More specifically, it will be noted that the vehicle mountable table 10 comprises a pair of spaced mounting brackets 12 which are operable to be releasably coupled to the door or seat of an associated vehicle. To this end, each of the mounting brackets 12 comprises a substantially straight member 14 which is integrally or otherwise fixedly secured to an arcuate member 16, as best shown in the side elevation view of FIG. 2. The arcuate member is operable to be inserted between the window glass and interior panel of an associated door, or alternatively, over the back of the seat of the vehicle to support the device 10 in position for use by a back seat passenger. A table 18 extends outwardly from the mounting brackets 12 and is adjustably coupled thereto by an adjustment means 20. The adjustment 20 is operable to support the table 18 at any of a plurality of heights relative to the mounting brackets 12.

Figure 4:
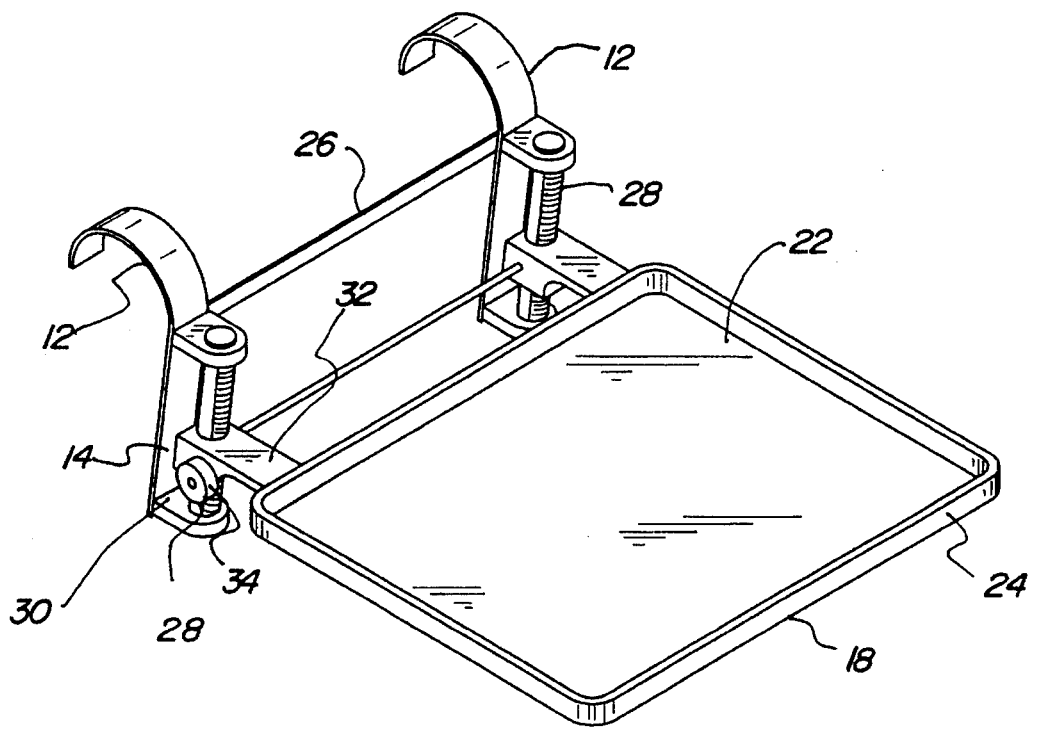
FIG. 4 is an isometric illustration of the present invention.

As shown in FIG. 4, the table 18 comprises a substantially rectangular planar member 22 having a perimeter side wall 24 extending about the planar member and projecting upwardly therefrom. Although the planar member 22 is illustrated as being substantially rectangular in shape, with the perimeter side wall 24 being correspondingly shaped, it is within the intent and purview of the present invention to provide a table 18 of any desired shape, including circular, arcuate, semi-circular, or the like. While the table 18 serves to support objects as desired and further operates to position the mounting brackets 12 in a spaced and parallel relationship, the present invention 10 may additionally include a transverse brace 26 extending between the mounting brackets 12 to further enhance the rigidity of the device 10.

Figure 2:
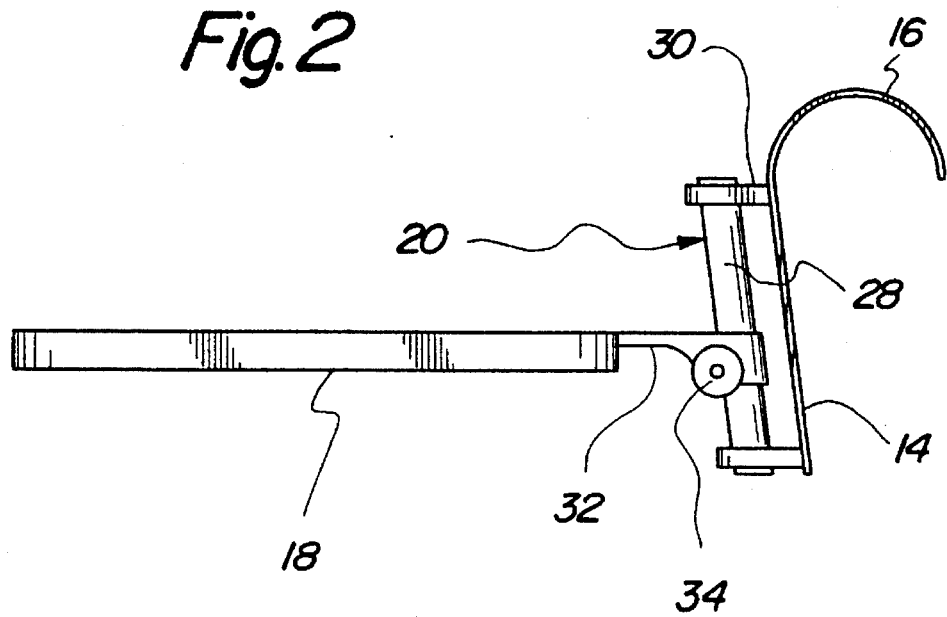
FIG. 2 is a side elevation view thereof.
Figure 3:
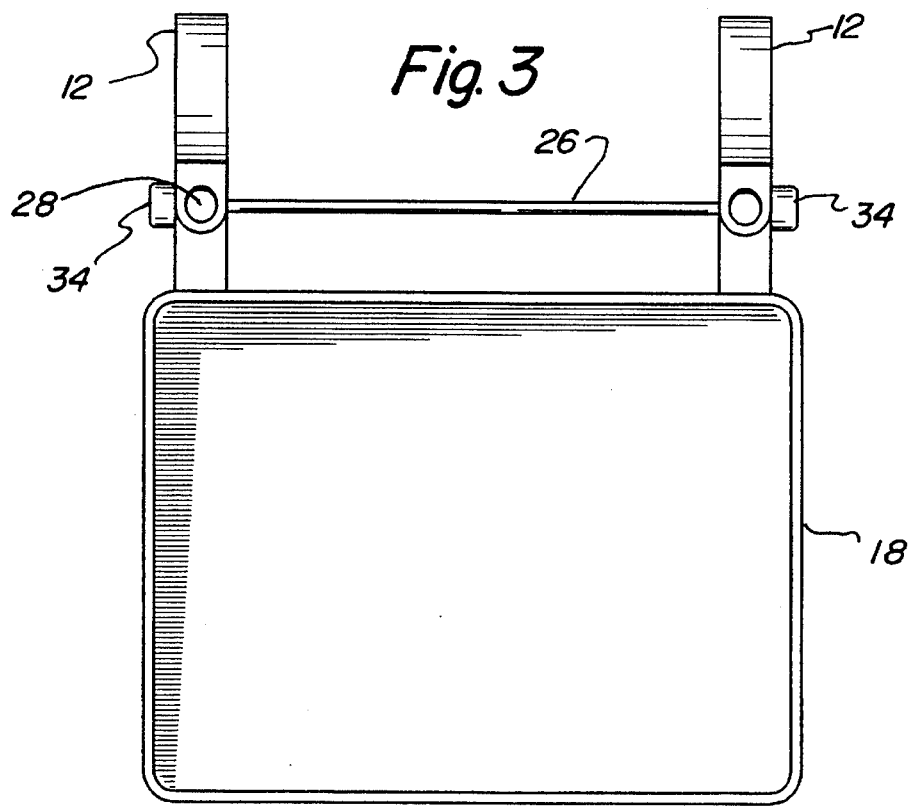
FIG. 3 is a top plan view of the invention.

As best illustrated in FIGS. 2 and 4, it can be shown that the adjustment means 20 of the present invention 10 preferably comprises a pair of vertical stanchions 28 which each extend along a respective mounting bracket 12. More specifically, each of the vertical stanchions 28 is coupled to the straight member 14 of a respective mounting bracket 12 by a pair of support posts 30 which project from the straight member and are coupled to opposed ends of the vertical stanchions. The adjustment means 20 further comprises a pair of support arms 32 each having an unlabeled through-extending aperture, with each arm being positioned about an individual one of the vertical stanchions 28 such that the vertical stanchion projects through the aperture of the support arm. The support arms 32 extend from the respective vertical stanchions 28 and are coupled to the table 18. By this structure, the support arms 32 can be slidably displaced relative to the vertical stanchions 28 to effect an adjustable positioning of the table 18 relative to the mounting brackets 12.

To selectively lock the support arms 32 relative to the vertical stanchions 28 to secure a position of the table 18 relative to the mounting brackets 12, a pair of adjustment knobs 34 are provided. Each of the adjustment knobs 34 is shaped so as to define a threaded projection which threadably engages the respective support arm 32 to alter a diameter of the through-extending aperture thereof. To this end, an unlabeled slot extends along a bottom of each of the support arms 32, whereby an axial advancing of the adjustment knob 34 will decrease a transverse diameter of the slot and consequently, decrease a diameter of the through-extending aperture to clamp the respective support arm 32 about the vertical stanchion 28. By this structure, the adjustment knob 34 can be selectively operated to secure or release the support arms 32 relative to the vertical stanchions 28 to effect positioning of the table 18 relative to the mounting brackets 12 as desired.

Turning now to FIG. 5, it can be shown that the adjustment means 20 of the present invention 10 may alternatively comprise a pair of adjustment knobs 34 each rotatably mounted to the respective support arm 32 and having an integrally formed gear which engages a rack 36 extending along each of the vertical stanchions 28. By this structure, a rotation of the adjustment knob 34 will effect translation of the support arms 32 relative to the vertical stanchions 28 to either raise or lower the table 18 relative to the mounting brackets 12. To ensure that both support arms 32 are raised and lowered together, a balancing rod 38 mechanically couples the adjustment knobs 34 together such that they rotate in unison. Further, it is to be understood that sufficient frictional engagement between the support arms 32 and the vertical stanchions 28 and/or between the adjustment knob 34 and the support arm 32 to which it is mounted is sufficient to retain a position of the table relative to the mounting brackets 12 subsequent to adjustment of the adjustment means 20.

In use, the vehicle mountable table of the present invention can be easily secured over the door or seat portion of an associated vehicle to support objects, such as food or the like in a desired position for use or consumption thereof, with the adjustment means 20 permitting configuration of the table of the device to a particular height.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle mountable table comprising:

a pair of spaced mounting brackets for releasably coupling to a portion of a vehicle;

a table; and, an adjustment means for adjustably coupling said table to said mounting brackets, wherein each of said mounting brackets comprises a substantially straight member having a top end fixedly secured to an arcuate member, wherein said adjustment means comprises a pair of vertical stanchions each extending along an individual one of said mounting brackets and being spaced therefrom; a pair of support arms each having a through-extending aperture, with each arm being positioned about an individual one of said vertical stanchion such that said vertical stanchions project through said apertures of said support arms, said support arms extending from said vertical stanchions and being coupled to said table, wherein said support arms can be slidably displaced relative to said vertical stanchions to effect an adjustable positioning of said table relative to said mounting brackets.

2. The vehicle mountable table of claim 1, wherein said adjustment means further comprises a pair of adjustment knobs for selectively locking said support arms relative to said vertical stanchions to secure a position of said table relative to said mounting brackets, each of said adjustment knobs being shaped so as to define a threaded projection which threadably engages an individual one of said support arms to alter a diameter of said through-extending aperture thereof, whereby an axial advancing of said adjustment knob will decrease a diameter of said through-extending aperture to clamp said support arm about said vertical stanchion.

3. The vehicle mountable table of claim 2, wherein each of said vertical stanchions is coupled to said straight member of a respective mounting bracket by a pair of support posts which project from said straight member and are coupled to opposed ends of said vertical stanchion.

4. The vehicle mountable table of claim 3, wherein said planar member is substantially rectangular in shape.

5. The vehicle mountable table of claim 1, wherein said vertical stanchions each include a rack extending therealong, and further wherein said adjustment means further comprises a pair of adjustment knobs each rotatably mounted to an individual one of said support arms and having an integrally formed gear which engages said rack extending along an individual one of said vertical stanchions, whereby a rotation of said adjustment knob will effect translation of said support arm relative to said vertical stanchion to raise and lower said table relative to said mounting brackets.

6. A vehicle mountable table comprising:

a pair of spaced mounting brackets for releasably coupling to a portion of a vehicle, each of said mounting brackets comprising a substantially straight member having a top end fixedly secured to an arcuate member;

a transverse brace extending between said mounting brackets;

a table including a substantially rectangular planar member having a perimeter side wall extending about said planar member and projecting upwardly therefrom; and, an adjustment means for adjustably coupling said table to said mounting brackets, said adjustment means comprising a pair of vertical stanchions each extending along an individual one of said mounting brackets and being spaced therefrom, a pair of support posts coupling each of said vertical stanchions to said straight member of a respective mounting bracket, said support posts projecting from said straight member and being coupled to opposed ends of said vertical stanchion; a pair of support arms each having a through-extending aperture, with each arm being positioned about an individual one of said vertical stanchions such that said vertical stanchions project through said apertures of said support arms, said support arms extending from said vertical stanchions and being coupled to said table, wherein said support arms can be slidably displaced relative to said vertical stanchions to effect an adjustable positioning of said table relative to said mounting brackets; a pair of adjustment knobs for selectively locking said support arms relative to said vertical stanchions to secure a position of said table relative to said mounting brackets, each of said adjustment knobs being shaped so as to define a threaded projection which threadably engages an individual one of said support arms to alter a diameter of said through-extending aperture thereof, whereby an axial advancing of said adjustment knob will decrease a diameter of said through-extending aperture to clamp said support arm about said vertical stanchion.

7. A vehicle mountable table comprising:

a pair of spaced mounting brackets for releasably coupling to a portion of a vehicle, each of said mounting brackets comprising a substantially straight member having a top end fixedly secured to an arcuate member;

a transverse brace extending between said mounting brackets;

a table including a substantially rectangular planar member having a perimeter side wall extending about said planar member and projecting upwardly therefrom; and, an adjustment means for adjustably coupling said table to said mounting brackets, said adjustment means comprising a pair of vertical stanchions each extending along an individual one of said mounting brackets and being spaced therefrom, a pair of support posts coupling each of said vertical stanchions to said straight member of a respective mounting bracket, said support posts projecting from said straight member and being coupled to opposed ends of said vertical stanchion; a pair of support arms each having a through-extending aperture, with each arm being positioned about an individual one of said vertical stanchions such that said vertical stanchions project through said apertures of said support arms, said support arms extending from said vertical stanchions and being coupled to said table, wherein said support arms can be slidably displaced relative to said vertical stanchions to effect an adjustable positioning of said table relative to said mounting brackets, said vertical stanchions each include a rack extending therealong; a pair of adjustment knobs each rotatably mounted to an individual one of said support arms and being mechanically engaged to said rack extending along an individual one of said vertical stanchions, whereby a rotation of said adjustment knob will effect translation of said support arm relative to said vertical stanchion to raise and lower said table relative to said mounting brackets.

\* \* \* \* \*